(12) United States Patent
Bibber

(10) Patent No.: US 8,388,826 B2
(45) Date of Patent: *Mar. 5, 2013

(54) CONVERSION COATING FOR MAGNESIUM, BERYLLIUM, AND THEIR ALLOYS AND ARTICLES THEREOF

(75) Inventor: John W. Bibber, Batavia, IL (US)

(73) Assignee: Sanchem, Inc., Chicago, IL (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/017,429

(22) Filed: Jan. 31, 2011

(65) Prior Publication Data

US 2011/0120877 A1 May 26, 2011

Related U.S. Application Data

(62) Division of application No. 11/971,960, filed on Jan. 10, 2008, now abandoned.

(51) Int. Cl.
  *C23C 28/00* (2006.01)
(52) U.S. Cl. .................................................. 205/198
(58) Field of Classification Search .............. 106/14.25, 106/14.22; 428/457; 205/198
  See application file for complete search history.

(56) References Cited

U.S. PATENT DOCUMENTS

| 4,840,820 | A  | * | 6/1989  | Schultz et al. | 427/305 |
| 5,693,153 | A  | * | 12/1997 | Rosengard      | 148/272 |
| 6,830,821 | B2 | * | 12/2004 | Bibber         | 428/457 |
| 7,048,807 | B2 |   | 5/2006  | Stoffer et al. |         |
| 2004/0249043 | A1 | * | 12/2004 | Stoffer et al. | 524/430 |
| 2006/0124466 | A1 |   | 6/2006  | Xu et al.     |         |

OTHER PUBLICATIONS

Unknown Author, Dairy Chemistry and Physics, Published Jan. 1, 2006.

* cited by examiner

*Primary Examiner* — Jennifer Michener
*Assistant Examiner* — Eli Mekhlin
(74) *Attorney, Agent, or Firm* — James B. Conte; Husch Blackwell LLP

(57) ABSTRACT

I provide a non-toxic protein and protein compound conversion coated metal article, a painted or plated non-toxic protein and protein compound conversion coated metal article, the aqueous coating solution to provide the in-situ conversion protective coating, and a process of preparing the article. The article is a metal selected from the group consisting of magnesium, magnesium alloy, beryllium and beryllium alloy. The solution has a pH of 3.0 to 12.0 and preferably 4.0 to 10.0 and a protein and protein compound concentration of 0.1 to 10% by weight and the protein and protein compound have a molecular mass of 16,700 to 1,000,000.

11 Claims, No Drawings

US 8,388,826 B2

CONVERSION COATING FOR MAGNESIUM, BERYLLIUM, AND THEIR ALLOYS AND ARTICLES THEREOF

CROSS-REFERENCE TO RELATED APPLICATION

This is a division of application Ser. No. 11/971,960, filed Jan. 10, 2008, now abandoned whose disclosures are incorporated herein by reference.

FIELD OF INVENTION

The present invention relates to the application and generation of a non-toxic and environmentally safe protein or protein compounds based conversion coating for magnesium, its alloys and Beryllium and its alloys. More particularly the invention relates to a composition and a method of conversion coating magnesium, its alloys, and Beryllium and its alloys with a non-toxic and environmentally friendly protein composition that reacts in-situ with the surface of the metal to generate a conversion coating that incorporates the metal in question.

BACKGROUND OF THE INVENTION

The chemical conversion coating of magnesium, its alloys and beryllium and its alloys is known in the art as a process whereby the surface of the metal is chemically converted to a surface that more easily accepts applied coatings, i.e. paint, and/or increases the corrosion resistance of the metal. An industry accepted process for the conversion coating of magnesium, its alloys and beryllium and its alloys involves the use of known carcinogens such as chromates (see: J. A. Hawk, Jr., R. E. Strock, Jr. and R. C. Fullerton-Batten, "Encyclopedia of Chemical Processing Design", volume 4, CRC Press, 1977, page 324. and ASTM D1732). As a result, chromates and related toxic materials are being displaced by less toxic alternatives.

Alternative conversion coatings in current use are based upon phosphates and/or anodizing or oxidation of the metal. Oxidized or phosphate generated conversion coatings tend to be brittle. In addition the processes require the use of long involved cleaning procedures involving toxic fluorides (see: Biestek, T., and Weber, J.: "Electrolytic and Chemical Conversion Coatings", Portculis Press. Ltd., Queensway House, 2 Queensway, Redhill Surrey, RHI 1QS, 1976 and http://www.pfonline.com/articles/019601.html).

A typical process for magnesium and its alloys would involve: Hot alkaline soak cleaner at about 180-200° F. for three to five minutes, D.I water rinse, dip in a mild acid solution to remove unwanted metal oxides, rinse in D.I. water, conversion coating in a phosphate based solution containing toxic fluorides and a final rinse (see: "Operations in Magnesium Finishing", Dow Chemical U.S.A., Magnesium Metals Technical Service and Development, Midland, Mich. 48640). Such a surface needs to be painted immediately after being produced as it will quickly oxidize and it provides no secondary corrosion resistance.

Electroplating or non-electrolytic plating of magnesium and/or Beryllium requires all of the above steps (with the exception of the phosphate treatment) and the application of an immersion zinc coating and/or the application of a film of copper using an alkaline copper cyanide plating bath. To provide for a unifoim and even plating surface. These processes are rather difficult to properly apply and even with the use of the above processing steps, the plating of magnesium and/or Beryllium is a very difficult process and needs to be sealed to prevent secondary corrosion problems or disbondment of the plating (see: Sakata," Electroless Nickel Plating Directly on Magnesium Alloy Die Castings", 74$^{th}$ AESF Technical Conference (1987)15).

SUMMARY OF THE INVENTION

This invention is directed towards making use of the corrosion resistant and adhesion characteristics of protein compounds or protein to generated conversion coatings on magnesium, its alloys and Beryllium and its alloys. The preferred coating is water based. The water based coating generates no volatile organic carbon compounds. In addition the coating does not contain any known toxic substances and will not generate any known toxic substances. The coating is very thin (less then 600 nm.) and as a result is sufficiently electrically conductive for use in aerospace applications.

This invention provides an aqueous conversion coating composition for the magnesium and beryllium metals, to generate an outer protective coating on the magnesium and beryllium metals. The protective conversion coating composition has as its essential ingredients thereof protein compounds or proteins that will react with the magnesium and beryllium metals to generate in-situ a coating that will more easily accept applied coatings and provide for a more corrosion resistant surface.

The invention also provides non-toxic magnesium, magnesium alloy, beryllium and beryllium alloy aqueous coating composition where in the essential ingredient is non-toxic protein to provide an outer protective coating for the non-toxic magnesium, magnesium alloy, beryllium and beryllium alloy and wherein the protein has a molecular mass of from 16,700 to 1,000,000 and provides a concentration of 0.1 to 10%, the pH of the composition is from 4.0 to 10.0, the protein is selected from the group consisting of casein, dried egg white, gelatin, serum albumin, hemoglobin, lacto globulin, gliadin. and mixtures thereof, and the composition provides an in-situ conversion coating on the metal that will provide oxidation resistance to the metal for at least 5 days at room temperature and allow the conversion coated metal to be painted such that a cured painted metal when the subjected to a salt fog at 95° F. for 200 hrs. the painted metal showed no signs of blistering and no signs of adhesion failure, and the composition provides an in-situ conversion coating on the metal that allows the conversion coated metal to be electroless plated and then placed in an oven at 350° F. for one half hour, removed and immediately quenched in water and the plated metal showed no signs of blistering or loss of adhesion.

The invention further provides a metal article wherein the metal is selected from the group consisting of magnesium, magnesium alloy, beryllium and beryllium alloy and said metal having thereon an in-situ non-toxic protein conversion coating wherein the protein has a molecular mass of 16,700 to 1,000,000 and is selected from the group consisting of casein, dried egg white, gelatin, serum albumin, hemoglobin, lacto globulin, gliadin. and mixtures thereof, and the conversion coated metal has oxidation resistance for at least 5 days at room temperature and when the conversion coated metal is painted or electroless metal plated, the cured painted conversion coated metal when subjected to a salt fog at 95° F. for 200 hrs. showed no signs of blistering and no signs of adhesion failure, and the electroless plated conversion coated metal when placed in an oven at 350° F. for one half hour, removed and immediately quenched in water showed no signs of blistering and no signs of adhesion failure.

Still another feature of the present invention is to provide a process of preparing the metal article wherein the metal selected from the group consisting of magnesium, magnesium alloy, beryllium and beryllium alloy, cleaning the metal article, making the metal a cathode or anode of an electrolytic cell containing an aqueous protein solution wherein the protein has a molecular mass of from 16,700 to 1,000,000 and is selected from the group consisting of casein, dried egg white, gelatin, serum albumin, hemoglobin, lacto globulin, gliadin, and mixtures thereof, and selected from protein and protein compounds, and the aqueous solution has a protein concentration of 0.1 to 10% by weight, and a pH of the composition is from 4.0 to 10.0; forming an in-situ protein conversion coating on the metal, Curing the conversion coated metal and painting or electroless plating the conversion coated metal wherein the painted conversion coated metal when subjected to a salt fog at 95° F. for 200 hrs. showed no signs of blistering and no signs of adhesion failure, and the electroless plated conversion coated metal when placed in an oven at 350° F. for one half hour, removed and immediately quenched in water showed no signs of blistering and no signs of adhesion failure.

DETAILED DESCRIPTION OF THE INVENTION

A magnesium or magnesium alloy and/or a beryllium or beryllium alloy is afforded corrosion resistant and receptive to the application of secondary coatings, i.e. paint, by having thereon an outer protective coating of proteins or protein compounds reacted with the magnesium and beryllium metals.

The protein generated conversion coatings are formed by making the magnesium and/or the beryllium metal the cathode or anode of an electrolytic cell in an electrolyte solution of the proteins or protein compounds made soluble by dissolving the materials in an acid or a basic solution.

Additional wetting agents or complexing agents may be added as needed to enhance their adhesive and/or protective ability. The amine and/or acid functionality of the protein and/or protein compounds will then attach themselves to the magnesium or beryllium metal and further react with the magnesium and/or beryllium metal so as to form a metal compound on the surface of the magnesium or beryllium metal that is strongly bonded to the magnesium or beryllium metal, and provides for a corrosion resistant surface that is receptive to the application of secondary coatings, i.e. paint.

To aid in the application of the protein and/or protein compounds the PH of the solution may be varied depending upon the particular metal being treated. Also, the concentration of the proteins and/or protein compounds may be varied depending upon the thickness of the coating so desired and the conductivity of the solution varied to increase or decrease the rate of deposition of the proteins and/or protein compounds. The lower limit of the concentration of these solutions is purely an economic matter. The lower the concentration of the ingredients to be deposited, the longer it will take to produce a film of sufficient thickness (about 600 nm.) to provide a good adhesive base and sufficient resistance to oxidation. The upper limits on the concentration of the solution will be the saturation point of the mixture in question.

In theory any PH may be used, but magnesium is quite soluble in strongly acid solutions and/or strongly basic solutions. Beryllium is soluble in strongly basic solutions. The most suitable PH range is 3.0 to 12.0 with the preferred PH 4.0 to 10.0. Temperature is of no concern to the process. The voltage must be above the reduction potential of the protein complexes and sufficient to maintain the required current density. Various other non-interfering materials may be added to the protein solutions to prevent biological attack, increase conductivity or control the PH (buffers) as long as these materials do not act to prevent proper film formation.

The basic composition used to form the corrosion resistant and more adhesive surface is a water based solution of 0.1% to 10% protein and/or protein compounds. The proteins and/or protein compounds preferable have a molecular mass of from 16,700 to 1,000,000. A widely used source of these proteins are milk and egg whites with casein from milk being the most preferred source as this is an excellent film forming source of proteins. Casein is quite environmentally friendly, non-toxic, inexpensive and readily available. Other useful protein sources are serum albumin, hemoglobin, lacto globulin and gliadin.

The aqueous solution generally contains from one to five percent proteins and/or protein compounds. The advantages gained by using my protein based conversion coatings are a total lack of any toxic and/or environmentally unfriendly compounds, excellent paint and/or plating adhesion on the magnesium and beryllium metals indicated, much simpler methods of application and corrosion resistance.

The industry standard for conversion coatings on the magnesium and beryllium metals, in tee ins of paint adhesion and corrosion resistance, continues to be the chromate generated coatings. As such the adhesion and corrosion resistance of these coatings is directly compared to chromate based systems whenever possible. The Beryllium alloys used in these examples is pure Beryllium or "AlBeMet", an aluminum-Beryllium alloy produced by "Brush Wellman Beryllium Products in Elmore Ohio, as it represents an extreme example of corrosion susceptibility and paint adhesion. In addition it is used in many aerospace applications. Pure magnesium and/or "AZ 312 B" or "AZ91D" were used in the examples as they are the two most widely used magnesium alloys and "AZ91D" is an example of a difficult to plate and/or paint magnesium alloy. There are no published bare salt spray corrosion resistant data on magnesium as it is far too easily corroded. We look for blistering of a painted magnesium surface after 200 hours of salt spray in accordance with ASTM B117 as outlined in "Boeing aircraft" Specification "DMS 1786L". In the following examples the percentages are percentages by weight.

EXAMPLE 1

A flat six inch by four inch panel of "AZ91D" magnesium alloy was soaked in a PH 13.0 alkaline cleaner at 180° F. for five minutes to remove all mold release compounds and/or oils, rinsed in D.I. water, made the cathode of an electrolytic cell containing 0.5% potassium hydroxide. This is electrolytically cleaned at 20 amps per square foot for five minutes at 120° F., rinsed in D.I., dipped in a PH 2.0 nitric acid solution for about 15 seconds to remove magnesium oxides, rinsed in D.I. water and made the cathode in a casein solution at a PH of 7.5. The casein solution consists of:
4.0% Casein
0.15% potassium hydroxide
1.2% potassium salt of Glycolic acid
Phosphoric acid used to adjust PH to 7.5

The casein was plated out on the surface of the metal with a current density of 14 amps per square foot for two seconds. The casein conversion coated magnesium alloy was then rinsed, dried and allowed to sit in the open for one week before being painted with a water based Epoxy Polyamide resin meeting the requirements of "Boeing" materials specification "DMS 1786L". The painted panel was allowed to cure for seven days and then placed in a salt spray cabinet for 200 hours according "ASTM" specification B117. The panel showed no signs of blistering and no signs of adhesion failure when tested as indicated in the specification or when tested according to "ASTM" specification D 3359.

EXAMPLE 2

A flat six inch by four inch panel of "AZ312B" magnesium alloy was soaked in a PH 13.0 alkaline cleaner at 180° F. for five minutes to remove all mold release compounds and/or oils, rinsed in D.I. water, made the cathode of an electrolytic cell containing 0.5% potassium hydroxide and electrolytically cleaned at 20 amps per square foot for five minutes at 120° F., rinsed in D.I., dipped in a PH 2.0 nitric acid solution for about 15 seconds to remove magnesium oxides, rinsed in D.I. water and made the cathode in a casein solution at a PH of 4.0. The casein solution consists of:
1.0% Casein
Phosphoric acid used to adjust PH to 4.0
Balance water The casein was plated out on the surface of the metal with a current density of 14 amps per square foot for four seconds. The casein conversion coated magnesium alloy was then rinsed, dried and allowed to sit in the open for one week before being painted with a water based Epoxy Polyamide resin meeting the requirements of "Boeing" materials specification "DMS 1786L". The painted panel was allowed to cure for seven days and then placed in a salt spray cabinet for 200 hours according "ASTM" specification B117. The painted panel showed no signs of blistering and no signs of adhesion failure when tested as indicated in the specification or when tested according to "ASTM" specification D 3359.

EXAMPLE 3

A flat six inch by four inch panel of "AZ91D" magnesium alloy was soaked in a PH 13.0 alkaline cleaner at 180° F. for five minutes to remove all mold release compounds and/or oils, rinsed in D.I. water, made the cathode of an electrolytic cell containing 0.5% potassium hydroxide and electrolytically cleaned at 20 amps per square foot for five minutes at 120° F., rinsed in D.I., dipped in a PH 2.0 nitric acid solution for about 15 seconds to remove magnesium oxides, rinsed in D.I. water and made the cathode in a casein solution at a PH of 3.0. The casein solution consists of:
4.0% Casein
Glycolic acid used to adjust PH to 3.0
Balance water The casein was plated out on the surface of the metal with a current density of 14 amps per square foot for two seconds. The casein conversion coated magnesium alloy was then rinsed, dried and allowed to sit in the open for one week before being painted with a water based Epoxy Polyamide resin meeting the requirements of "Boeing" materials specification "DMS 1786L". The painted panel was allowed to cure for seven days and then placed in a salt spray cabinet for 200 hours according "ASTM" specification B117. The painted panel showed no signs of blistering and no signs of adhesion failure when tested as indicated in the specification or when tested according to "ASTM" specification D 3359.

EXAMPLE 4

A flat six inch by four inch panel of "AZ91D" magnesium alloy was soaked in a PH 13.0 alkaline cleaner at 180° F. for five minutes to remove all mold release compounds and/or oils, rinsed in D.I. water, made the cathode of an electrolytic cell containing 0.5% potassium hydroxide and electrolytically cleaned at 20 amps per square foot for five minutes at 1200° F., rinsed in D.I., dipped in a PH 2.0 nitric acid solution for about 15 seconds to remove magnesium oxides, rinsed in D.I. water and made the cathode in a albumin solution at a PH of 12.0. The protein solution consists of:
4.0% dried egg white
Potassium Hydroxide to adjust the PH to 12.0
Balance water The egg white protein was plated out on the surface of the magnesium alloy with a current density of 14 amps per square foot for two seconds. The egg white conversion coated magnesium alloy was then rinsed, dried and allowed to sit in the open for one week before being painted with a solvent based polyurethane resin. The painted panel was allowed to cure for seven days and then placed in a salt spray cabinet for 200 hours according "ASTM" specification B117. The painted panel showed no signs of blistering and no signs of adhesion failure when tested as indicated in the specification or when tested according to "ASTM" specification D 3359.

EXAMPLE 5

A flat six inch by four inch panel of "AZ91D" magnesium alloy was soaked in a PH 13.0 alkaline cleaner at 180° F. for five minutes to remove all mold release compounds and/or oils, rinsed in D.I. water, made the cathode of an electrolytic cell containing 0.5% potassium hydroxide and electrolytically cleaned at 20 amps per square foot for five minutes at 120° F., rinsed in D.I., dipped in a PH 2.0 nitric acid solution for about 15 seconds to remove magnesium oxides, rinsed in D.I. water and made the cathode in a gelatin solution at a PH of 9.5. The protein solution consisting of:
10.0% gelatin
enough potassium hydroxide to dissolve the gelatin
Balance water The gelatin protein was plated out on the surface of the magnesium alloy with a current density of 14 amps per square foot for one second. The gelatin conversion coated magnesium alloy was then rinsed, dried and allowed to sit in the open for one week before being painted with a water based polyester resin. The painted panel was allowed to cure for seven days and then placed in a salt spray cabinet for 200 hours according "ASTM" specification B117. The painted panel showed no signs of blistering and no signs of adhesion failure when tested as indicated in the specification or when tested according to "ASTM" specification D 3359.

EXAMPLE 6

A flat six inch by four inch panel of "AZ91D" magnesium alloy was soaked in a PH 13.0 alkaline cleaner at 180° F. for five minutes to remove all mold release compounds and/or oils, rinsed in D.I. water, made the cathode of an electrolytic cell containing 0.5% potassium hydroxide and electrolytically cleaned at 20 amps per square foot for five minutes at 120° F., rinsed in D.I., dipped in a PH 2.0 nitric acid solution for about 15 seconds to remove magnesium oxides, rinsed in D.I. water and made the cathode in a casein solution at a PH of 7.5. The protein solution consists of:
4.0% Casein
0.15% potassium hydroxide
1.2% potassium salt of Glycolic acid
Phosphoric acid used to adjust PH to 7.5

The casein protein was plated out on the surface of the metal with a current density of 14 amps per square foot for two seconds. The casein conversion coated magnesium alloy was then rinsed with D.I. water and placed in a PH 5.0 fluoride based electroless nickel plating bath for one hour to plate out a 0.001 inch thick film of electroless nickel. The nickel plated panel was then placed in an oven at 350 0 F. for one half hour, removed and immediately quenched in water as outlined in MIL-C-16074E. The nickel panel showed no signs of blistering or no loss of nickel adhesion.

EXAMPLE 7

A flat six inch by four inch panel of pure beryllium was made the cathode of an electrolytic cell containing 2.5 grams per liter sodium carbonate and electrolytically cleaned at 20 amps per square foot for 30 seconds at 70° F., rinsed in D.I. and made the cathode in a casein solution at a PH of 7.5. The protein solution consists of:
4.0% Casein
0.15% potassium hydroxide
1.2% potassium salt of Glycolic acid
Phosphoric acid used to adjust PH to 7.5

The casein protein was plated out on the surface of the beryllium with a current density of 14 amps per square foot for two seconds. The casein conversion coated beryllium was then rinsed in D.I. water and placed in a PH 5.0 fluoride based electroless nickel plating bath for one hour to plate out a 0.001 inch thick film of electroless nickel. The nickel coated beryllium panel was then placed in an oven at 350° F. for one half hour, removed and immediately quenched in water as outlined in MIL-C-16074E. There was no blistering or loss of nickel adhesion to the nickel coated beryllium panel.

EXAMPLE 8

A flat six inch by four inch panel of "AlBeMet" aluminum-beryllium alloy was made the cathode of an electrolytic cell containing 2.5 grams per liter sodium carbonate and electrolytically cleaned at 20 amps per square foot for 60 seconds at 70° F., rinsed in D.I. and made the cathode in a casein/gelatin solution at a PH of 6.0 consisting of:
3.0% Casein
1.0% Gelatin
0.15% potassium hydroxide
1.2% potassium salt of Glycolic acid
Glycolic acid used to adjust PH to 6.0

The casein/gelatin proteins were plated out on the surface of the beryllium alloy with a current density of 14 amps per square foot for two seconds. The casein/gelatin conversion coated beryllium alloy was then rinsed in D.I. water and placed in a PH 5.0 fluoride based electroless nickel plating bath for one hour to plate out a 0.001 inch thick film of electroless nickel. The nickel coated panel was then placed in an oven at 350 0 F. for one half hour, removed and immediately quenched in water as outlined in MIL-C-16074E. There was no blistering or loss of nickel adhesion to the nickel coated beryllium alloy panel.

EXAMPLE 9

A flat six inch by four inch panel of "AlBeMet" aluminum-beryllium alloy was made the cathode of an electrolytic cell containing 2.5 grams per liter sodium carbonate and electrolytically cleaned at 20 amps per square foot for 60 seconds at 70° F., rinsed in D.I. and made the cathode in a casein/albumin solution at a PH of 9.0. The protein solution consists of:
2.0% Casein
4.0% dried egg white
Potassium Hydroxide to adjust the PH to 9.0
Balance water The casein/egg white proteins were plated out on the surface of the beryllium alloy with a current density of 14 amps per square foot for one second. The casein/egg white conversion coated beryllium alloy was then rinsed, dried and painted with a solvent based polyurethane resin. The pained beryllium alloy panel was allowed to cure for seven days and then tested according to "ASTM" specification D 3359 for paint adhesion. There was no paint failure.

EXAMPLE 10

A flat six inch by four inch panel of pure beryllium was made the cathode of an electrolytic cell containing 2.5 grams per liter sodium carbonate and electrolytically cleaned at 20 amps per square foot for 60 seconds at 70° F., rinsed in D.I. and made the cathode in a casein solution at a PH of 3.0. The protein solution consists of:
2.0% Casein
Phosphoric acid to adjust the PH to 3.0
Balance water The casein protein was plated out on the surface of the beryllium with a current density of 14 amps per square foot for two seconds. The casein conversion coated beryllium was then rinsed, dried and painted with a water based polyamide coating. The painted beryllium panel was allowed to cure for seven days and then tested according to "ASTM" specification D 3359 for paint adhesion. There was no paint failure.

EXAMPLE 11

A flat six inch by four inch panel of pure magnesium was soaked in a PH 13.0 alkaline cleaner at 180 degrees F. for five minutes to remove all mold release compounds and/or oils, rinsed in D.I. water, made the cathode of an electrolytic cell containing 0.5% potassium hydroxide and electrolytically cleaned at 20 amps per square foot for five minutes at 120 degrees F., rinsed in D.I., dipped in a PH 2.0 nitric acid solution for about 15 seconds to remove magnesium oxides, rinsed in D.I. water and made the anode in a casein solution at a PH of 7.5 consisting of:
4.0% Casein
0.15% potassium hydroxide
1.2% potassium salt of Glycolic acid
Phosphoric acid used to adjust PH to 7.5

The proteins and/or protein compounds were plated out on the surface of the metal with a current density of 14 amps per square foot for two seconds. The metal was then rinsed with D.I. water and placed in a PH 5.0 fluoride based electroless nickel plating bath for one hour to plate out a 0.001 inch thick film of electroless nickel. The plated panel was then placed in an oven at 350 degrees F. for one half hour, removed and immediately quenched in water as outlined in MIL-C-16074E. There was no blistering or loss of nickel adhesion to the metal panel.

EXAMPLE 12

A flat six inch by four inch panel of pure Beryllium was made the cathode of an electrolytic cell containing 2.5 grams per liter sodium carbonate and electrolytically cleaned at 20 amps per square foot for sixty seconds at 70 degrees F., rinsed in D.I. and made the anode in a protein solution at a PH of 7.5 consisting of:
3.0. % Casein
2.0% gelatin
0.15% potassium hydroxide 1.2% potassium salt of Glycolic acid
Phosphoric acid used to adjust PH to 7.5

The proteins and/or protein compounds were plated out on the surface of the metal with a current density of 14 amps per square foot for two seconds. The metal was then rinsed with D.I. water and placed in a PH 5.0 fluoride based electroless nickel plating bath for one hour to plate out a 0.001 inch thick film of electroless nickel. The plated panel was then placed in an oven at 350 degrees F. for one half hour, removed and immediately quenched in water as outlined in MIL-C-16074E. There was no blistering or loss of nickel adhesion to the metal panel.

While the invention has been described with a high degree of particularity, it will be appreciated by those skilled in the art that modifications may be made thereto. Therefore, it is to be understood that the present invention is not limited to the embodiments described above, but encompasses any and all embodiments within the scope of the following claims.

I claim:

1. A process for plating a magnesium article, a beryllium article or an alloy of beryllium or magnesium article comprising:
   a) preparing the surface of the magnesium article, the beryllium article or the alloy of beryllium or magnesium article by treating the magnesium article, the beryllium article or the alloy of beryllium or magnesium article to remove unwanted alloyed metals or metal oxides;
   b) making the magnesium article, the beryllium article or the alloy of beryllium or magnesium article a cathode or an anode of an electrolytic cell containing an aqueous solution or dispersion of a protein;
   c) applying an electric current to the electrolytic cell wherein the protein becomes chemically bonded directly to the magnesium article, the beryllium article or the alloy of beryllium or magnesium article;
   d) placing the protein-bonded magnesium article, protein-bonded beryllium article or protein-bonded alloy of beryllium or magnesium article into an electroless metal plating bath containing a metal; and
   e) electroless plating the metal onto the protein-bonded magnesium article, protein-bonded beryllium article or protein-bonded alloy of beryllium or magnesium article to produce a metal-plated magnesium article, a metal-plated beryllium article or a metal-plated alloy of beryllium or magnesium article.

2. The process of claim 1 wherein the protein has a molecular mass in the range of 16,700 to 1,000,000 and is present in the aqueous solution at a concentration of 0.1 to 10%.

3. The process of claim 1 wherein the protein is selected from the group consisting of casein, dried egg white, gelatin, serum albumin, hemoglobin, lacto globulin, gliadin and mixtures thereof.

4. The process of claim 1 wherein the metal-plated magnesium article, metal-plated beryllium article or metal-plated alloy of beryllium or magnesium article when placed in an oven at 350° F. for one half hour, removed and immediately quenched in water exhibits no signs of blistering and no signs of adhesion failure.

5. The process of claim 1 wherein the aqueous solution has a pH in the range of about 3.0 to about 12.0.

6. The process of claim 1 wherein the aqueous solution has a pH in the range of about 4.0 to about 10.0.

7. The process of claim 1 wherein the aqueous solution further comprises a buffering agent, an agent to prevent biological attack of the protein, or an agent to increase the conductivity of the aqueous solution.

8. The process of claim 1 wherein the protein comprises casein.

9. The process of claim 1 wherein the protein comprises a mixture of casein and albumin.

10. The process of claim 1 wherein the protein comprises a mixture of casein and gelatin.

11. The process of claim 1 wherein the metal within the electroless plating bath is nickel.

* * * * *